Sept. 30, 1958  R. H. SHEPPARD  2,853,892
TRACTOR DRIVE WITH DUAL CLUTCH
Filed Feb. 1, 1952  5 Sheets-Sheet 1

Inventor
RICHARD. H. SHEPPARD,
By *Henry H Snelling*
Attorney

Sept. 30, 1958  R. H. SHEPPARD  2,853,892
TRACTOR DRIVE WITH DUAL CLUTCH
Filed Feb. 1, 1952  5 Sheets-Sheet 4
FIG. 4
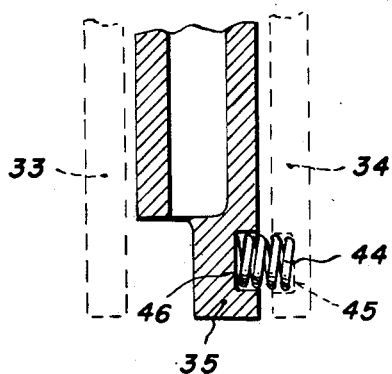
FIG. 5
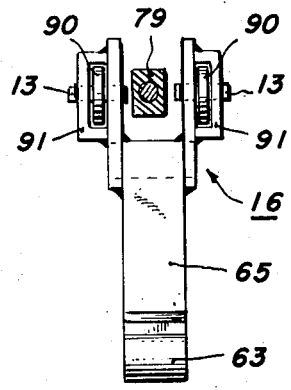
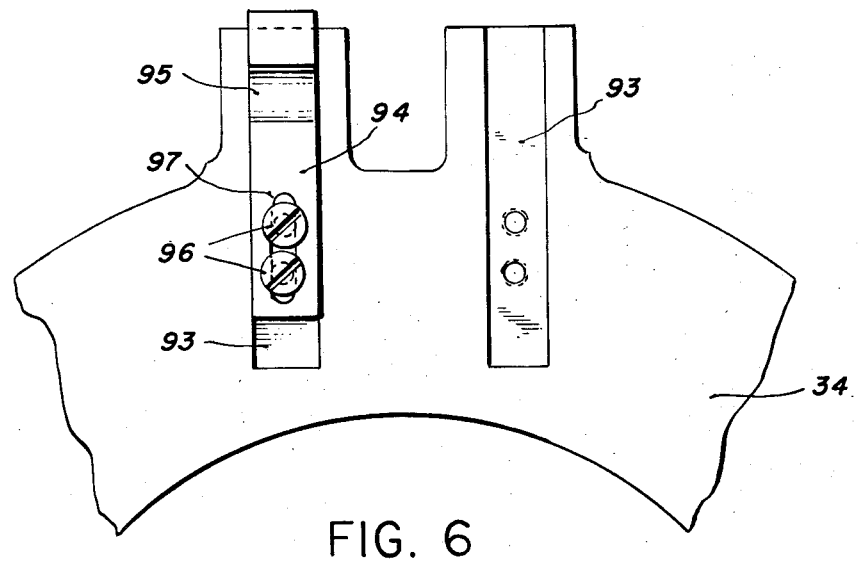
FIG. 6
Inventor
RICHARD H. SHEPPARD,
By Henry H. Snelling
Attorney Sept. 30, 1958   R. H. SHEPPARD   2,853,892
TRACTOR DRIVE WITH DUAL CLUTCH
Filed Feb. 1, 1952   5 Sheets-Sheet 5
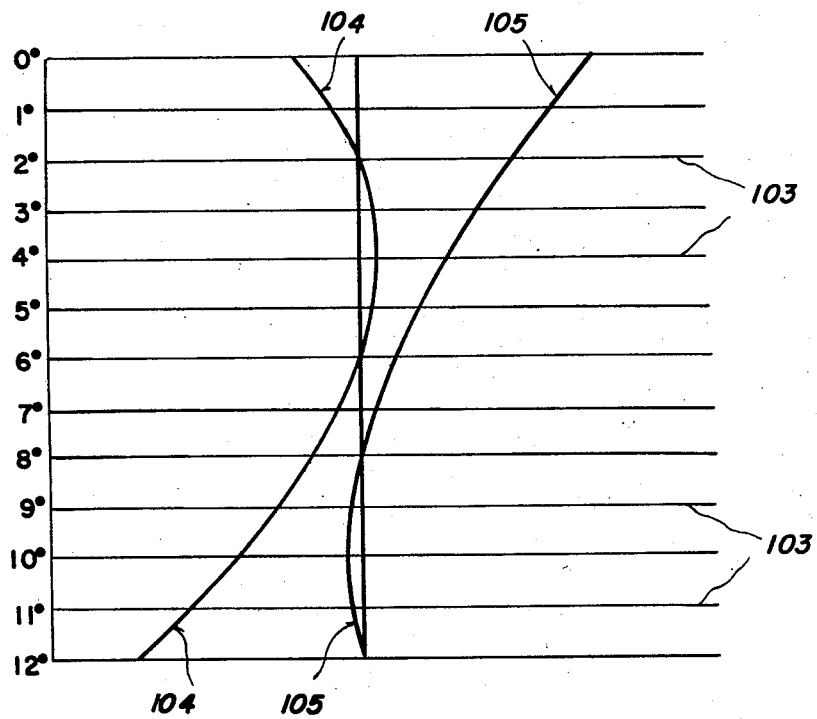
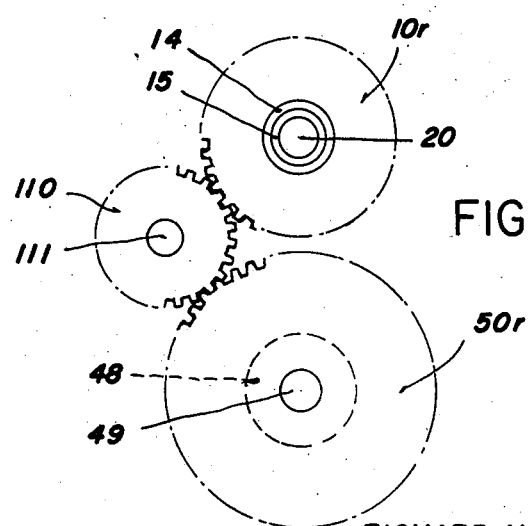
Inventor
RICHARD H. SHEPPARD,
By Henry H. Snelling
Attorney

2,853,892

TRACTOR DRIVE WITH DUAL CLUTCH

Richard H. Sheppard, Hanover, Pa.

Application February 1, 1952, Serial No. 269,449

23 Claims. (Cl. 74—330)

This invention relates to driving mechanism for tractors and has for its principal object the provision of mechanism for increasing or decreasing the rate of speed of a tractor without the need for stopping the tractor while making the change.

Another object of the invention is to provide dual clutches for connecting at will either a higher speed or a lower speed driving gear with a conventional transmission shaft driving the bull gear thru any selected one of the various speed combinations available in the tractor.

A further object of the invention is the provision of clutch actuating devices which in the midposition of the manually controlled clutch shift lever engages one of the clutches and the other is free, by a further forward movement of the lever the first clutch is freed and the second clutch is engaged, while by movement of the lever to initial position, i. e., nearest the driver, both clutches are disengaged, the mechanism being then in neutral.

A still further object of the invention is to provide a clutch which can be shifted from forward to reverse by a single movement, this object being obtained by the mere addition of an idler in the low speed gearing and an increase of clearance or adding a few more degrees of travel between engagements of the low (reverse) disk and the high (forward) disk. This would then give, in order, as the control lever is moved forward, a neutral position, a reverse position, a second neutral position, and a forward position, thus obviously saving an operator not only considerable time but lessening his fatigue in cases where much reversing is required, as in shovel loaders, for example.

Still further objects of the invention are stated in the claims and include the provision of a highly efficient roller carrying rocker pivotally mounting a pair of members connected at their free ends to a link secured to a clutch pressure plate and having means for adjusting the length of the link between the pressure plate and the rocker carried pivot and separate means for moving the latter pivot within the rocker to alter the timing of the engagement of the low speed clutch and in other ways to insure maximum efficiency.

In plowing the average field using a tractor with a multispeed transmission there is almost always encountered a portion that is hilly or in which there is a soft spot or a hard spot of sufficient change in texture to require changing the gears to either a higher or a lower ratio. As soon as this spot or area is passed, one must change the gears back to the gear ratio that is the best suited to the field as a whole. Unfortunately, in conventional farm tractors there is no way to change gears without bringing the tractor to a complete stop. This action includes stopping the tractor by putting in the clutch, then shifting the gear, then re-engaging the clutch. As soon as the soft or hard spot or uphill or downhill slope is passed, the entire performance must be repeated. In each and every case all benefit of momentum is lost. Assuming that the area under consideration is a wet spot only about 50 feet wide in a rectangular field of even as little as ten acres, the necessity to stop to change from one speed transmission to another would require two stops for every round of the field so with a hundred rounds there would be 200 stops and starts, all of which are entirely avoided in the illustrated assembly since the presently shown over-center hand-operated clutches can be shifted to increase or decrease the speed of travel and conversely the power of the tractor while the tractor is proceeding at any chosen one of the available transmission rates.

The selection of speed made in starting to plow the field is not changed but the dual clutch arrangement here illustrated permits altering speed and power equal to a change roughly approximating one and one-half speed changes as made by the ordinary 5-speed transmission. The conventional set of transmission gears is not altered, the present invention merely contemplating selection of either a higher speed pinion or a lower speed pinion to drive a spool of two connected wheels on the counter shaft of the transmission. Both the higher speed pinion and the lower speed pinion are constantly in mesh with such spool, so these two pinions will constantly turn in the same direction but at different speeds when either of the two clutches is engaged and both pinions will idle when the clutch is in neutral position of the manual clutch lever, such neutral position differing from usual practice in that it is at one end of travel of the lever and not in the center as customary.

In the drawings:

Figure 4 is a radial section on line 4—4 of Figure 2 showing the springs separating the rear and intermediate clutch engaging members or pressure plates;

Figure 5 is a detail on line 5—5 of Figure 3 primarily showing the roller cages of the rocker;

Figure 6 is a plan view of roller stop plates;

Figure 7 is a graph showing clearances as the rocker is oscillated;

Figure 8 is a modification substituting reverse for the low speed.

Figure 1:
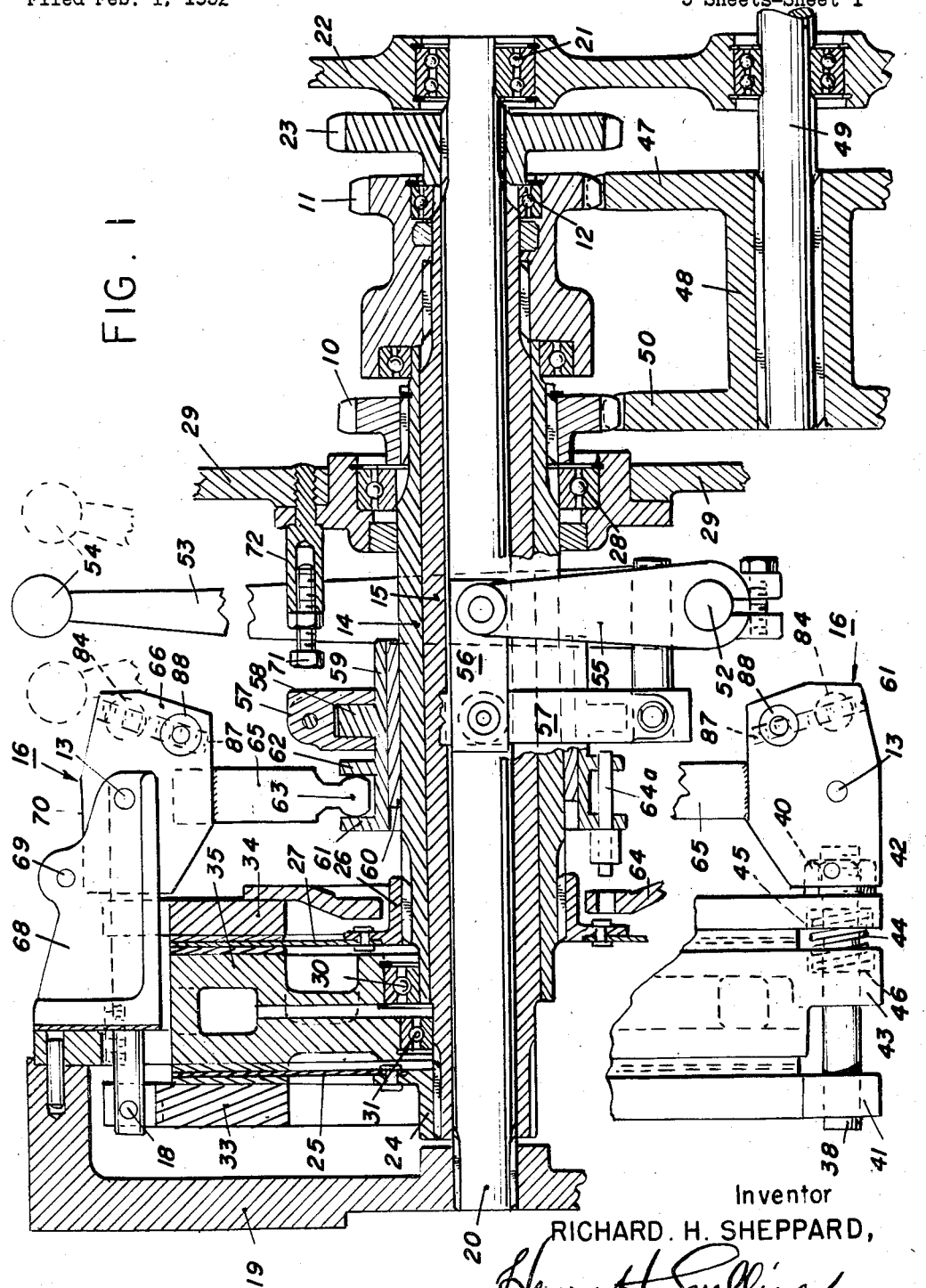
Figure 1 is a central section.
Figure 2:
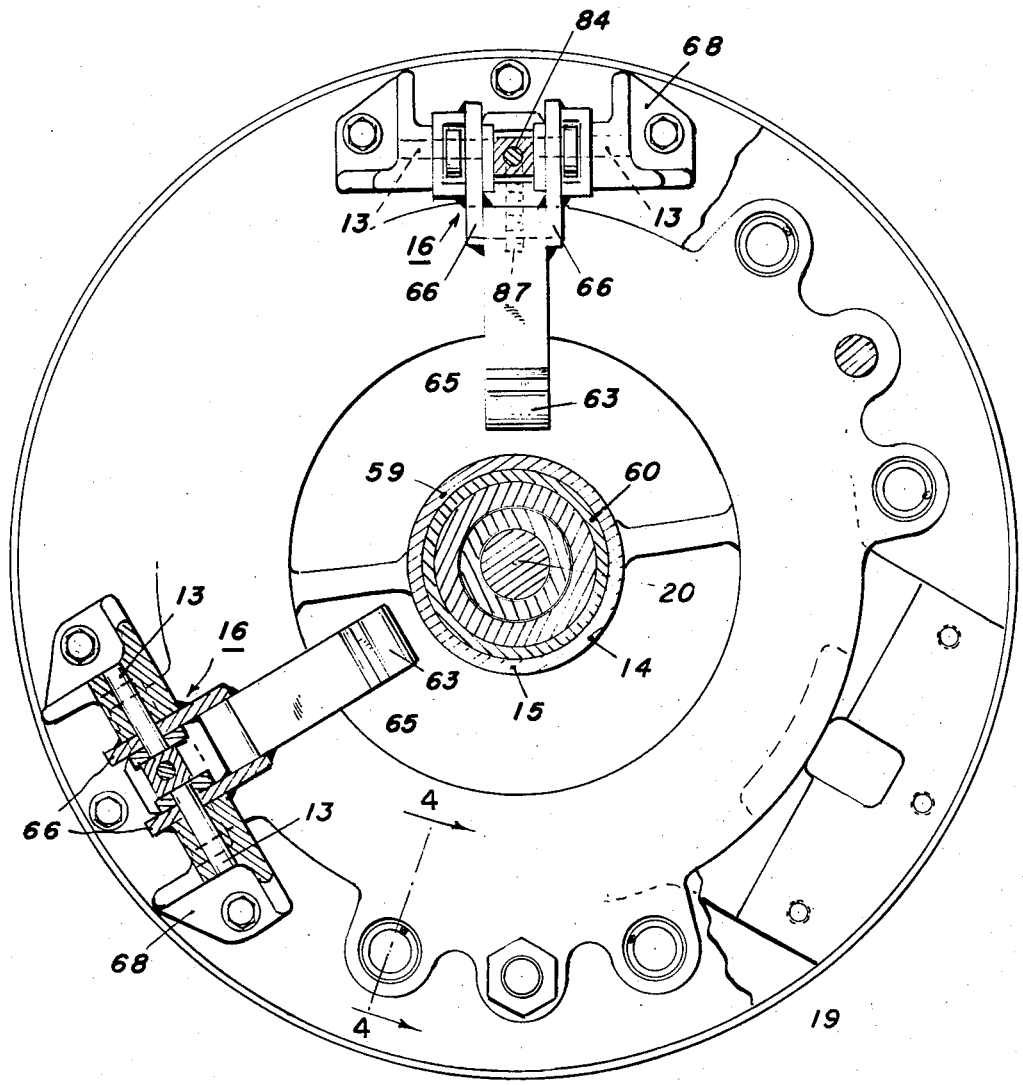
Figure 2 is an end view of the clutch mechanism showing parts in section.

The prime purpose of the invention is satisfied by interposing between a tractor vehicle propelling shaft and the engine, two engine driven driving gears which selectively drive such vehicle propelling shaft which, in turn, is connected thru any chosen one of a series of multi-speed transmission gears to the ground wheels, and to selectively idle either or both of the two driving gears.

In the embodiment of the invention illustrated, the gears 10 and 11 are mounted upon coaxial sleeves 14 and 15 each controlled by a clutch, the clutches being side by side and engaged or disengaged by an angular spaced series of operating devices each including a rocker 16 with a forward camming end engaging a cam follower, which is actually the pressure plate of the higher speed gear, and having at the other end a pitman 17 pivoted to the forward or low speed clutch pressure plate by wrist-pin 18, the crank at the other end of the pitman 17 being a system of linkages of the element 16 conveniently termed a rocker. Shifting the rocker in one direction releases both of the clutches; shifting the rocker in the opposite direction engages the high speed clutch and frees the low speed clutch, while in the central position the rocker engages the low speed clutch and frees the high speed clutch.

The driving member at the left of Figure 1 is an engine driven fly-wheel 19 fast to solid shaft 20 supported by bearings 21 in frame member 22 just rearward of constantly rotating power take-off pinion 23 splined to central shaft 20. The low-speed sleeve 15 surrounding the solid shaft 20 carries at its forward end the splined hub 24 of flat ring 25 which is the central member of the low speed clutch. At the other end of the sleeve 15 is splined the low speed driving pinion 11 turning on bearings 12 held in place by the adjacent power take-off gear 23.

Surrounding the low speed sleeve 15 is the high speed sleeve 14 carrying hub 26 of the high speed clutch ring 27. The two clutch rings or driving disks 27 and 25 are therefore coaxial and parallel, one secured to the outer sleeve 14 and the other secured to the inner sleeve 15. The high speed pinion 10 is secured to the inner end of outer sleeve 14 which end is supported in ball bearings 28 carried by the portion 29 of the housing, while the front end turns in bearings 30.

The dual clutches in addition to the flat rings or driving disks 25 and 27 include a forward low speed pressure plate 33, a rear high speed pressure plate 34, and the two intermediate or central plates which preferably are combined in a single unit which is given numeral 35. The intermediate clutch member near the front ends of sleeves 14 and 15 carries ball bearings 30 and 31 positioned between the hubs 24 and 26. The outside pressure plates 33 and 34 are axially movable independently of each other to engage or disengage their respective flat rings but are held against relative rotation by means of a number of spaced guide members 38 having a sliding fit in ears 41 and 42 extending radially outwardly from the friction clutch members 33 and 34. These guide members 38 have press fits with the ears 43 of clutch member 35 and are thus anchored to such member.

The members 34 and 35 are resiliently held apart by strong springs 44 fitting in recesses 45 and 46 of the high speed clutch member and of the intermediate or center member. A nut 40 on the threaded portion of guide member 38 determines the limits of travel of the pressure plate 34 away from the intermediate member 35 to which the center pins or guide members 38 are secured, as best seen in Figure 4. While not particularly important, I prefer to use three guide members 38 spaced angularly at 120° and to position the springs 44 on both sides of the guide member 38 at an angle of 20° thus using six springs 44.

Whenever the clutch members 33 and 35 engage the flat ring 25, the low speed pinion 11 drives gear 47 of spool 48 fast on vehicle propelling counter shaft 49. Since the gear 50, also on this spool 48 is in mesh with high speed pinion 10, the outer sleeve 14 revolves idly in the same direction as the sleeve 15 which is now driving. In the same way when clutch members 34 and 35 engage the high speed driving disk 27, the outer sleeve 14 is driven and power goes to shaft 49 thru gears 10 and 50, in which case pinion 11 revolves the sleeve 15 idly in the same direction of rotation as sleeve 14, the members 33 and 35 not engaging their flat ring 25 on this sleeve.

The mechanism for actuating the dual clutches includes transverse clutch shifting shaft 52 oscillated by a manually operated lever 53 convenient to the driver. The handle 54 of this lever is shown in its three positions: center being low, forward being high and rearward, or nearest to the driver, being neutral. On the shaft 52 is a shifter yoke 55 connected by shifter link 56 to a bronze collar 57 conveniently made in two pieces so as to engage loosely a sturdy annular flange 58 on shifter sleeve 59 which slides axially on an annular bearing 60 on sleeve 14. This shifter sleeve 59 has additional spaced annular flanges 61 and 62 receiving between them the terminal rounded cylinders 63 of angularly spaced fingers 65 each forming the stem portion of the roller carrying rocker 16. The two outside plates 66 of these rockers are welded on opposite sides of the fingers 65, there preferably being three of these rocker stems 65 spaced 120° apart and located angularly midway between proximate springs 44.

Each of these three roller carrying rockers 16 oscillates about a pair of fulcrum pins 13 extending inwardly from spaced inturned arms 67 of a bracket 68 bolted to the intermediate dual clutch member 35 and also to the fly-wheel or other driving member 19. The swinging movement of the roller carrying rocker 16 may be limited in the high speed direction by an optional stop 69 on the bracket 68, engaging the upper edge 70 of plate 66 of the rocker.

The shifter sleeve engages the spider 64 which carries the three pins 64a which rotate the shifter sleeve, when the clutch is in high, so the stop is not essential. Movement in the other or neutral direction is limited by stop 71 threaded in its support 72 securely mounted in frame or housing member 29, this stop being engaged at the chosen limit of travel of the rocker stem 65 by the collar 57 striking against the head of the stop 71 in its adjusted position.

Figure 3:
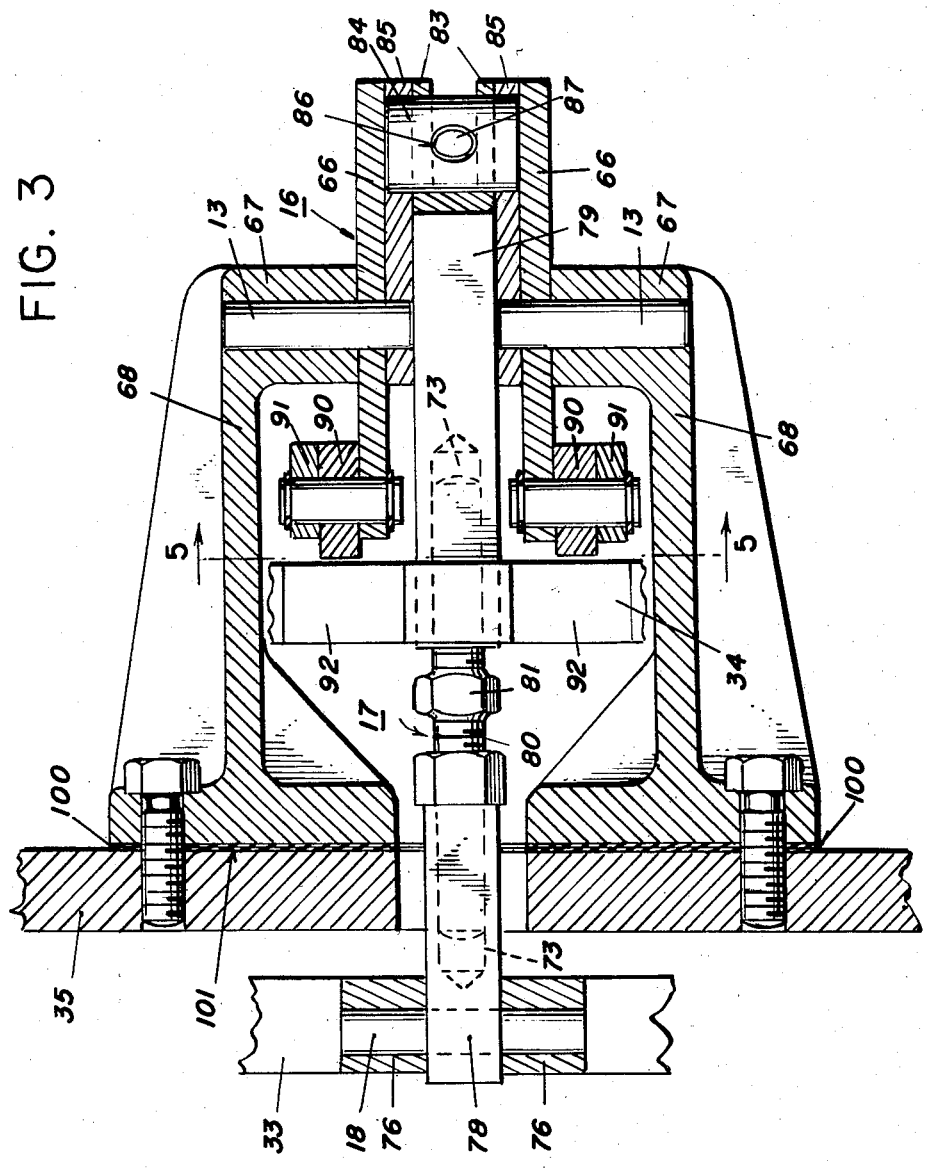
Figure 3 is a horizontal section on line 3—3 of Figure 1 illustrating primarily the adjusting bar.

Referring particularly to Figure 3, the pressure member 33 carries at its top and at 120° from the top on each side, a pair of parallel, nearly radial lugs 76 transversely bored to receive the wrist pin 18 of pitman 17 which comprises two spaced portions 78 and 79, each square in cross-section and tapped as at 73, as well as an adjusting screw 80 with right and left-hand threaded ends having a central nut 81 which when turned alters the distance between the bars 78 and 79 of the pitman 17, the double-ended screw 80 thus forming the central portion of the pitman. The rear end of bar 79 carries a yoke 83 which increases the height of the pitman but not the width. The two arms of yoke 83, which is the rear end of the pitman, are bored to receive a knuckle pin 84 carried by parallel links 85. This pin 84, held against axial movement by plates 66, is transversely tapped as at 86 to receive a timing screw 87 which is similarly threaded into fixed or anchoring cylinder 88. The two links 85 pivot about the two coaxial fulcrum pins 13 in bracket 68 to take various positions as the screw 87 is adjusted. By turning the timing screw 87, the distance between the center of anchor pin 88 and the center of movable knuckle pin 84 is adjusted so that when handle 54 of the driver operated shaft lever 53 is in center position the pitman 17 is at the proper angle to horizontal to provide over-center position, the lower speed clutch is engaged and the higher speed clutch is disengaged with its driving ring 27 free of the friction plates.

The roller carrying rocker 16 which oscillates about the two spaced fulcrum pins 13 carries at its forward or camming end a pair of rollers 90 each mounted in a channel-shaped cage member 91 (see Fig. 5) welded to the plates 66 of the rocker, the rollers projecting forward of the rocker so as to touch lightly two radial lugs 92 projecting from the pressure plate 34 of the higher speed clutch when in half-way position of the rockers, that is when the fingers 65 forming the rocker stems are exactly radial as shown in the drawing. In practice other positions might be more advantageous.

While not essential, it is highly desirable to give the driver a very positive indication that the manual lever 53 is in midposition, i. e., low speed. A groove could readily be cut in the high speed pressure plate 34 for engagement by the rollers 90 but this is a bit unwise due to the consequent hardening of the metal at this point. A half inch slot 93 (see Fig. 6) is therefore milled out in the line of travel of the rollers 90 and in this slot is mounted a hardened steel stop plate 94 having a cylindrical depression 95 which receives the rollers at exactly the midpoint of travel, correct adjustment and locking being made by a pair of screws 96 thru slot 97 in the plate.

Thus as the driver moves the main clutch lever forward from neutral position he is very definitely aware of the midposition and he thus avoids damage to the machine that might possibly be caused by leaving the lever in a position between low and high or between low an neutral. By this arrangement the location of the depression 95 determines the engaged position of the driving ring 25 of the low speed clutch, so it is permissible for nuts 40 to allow high speed plate 34 to rest against the several rollers 90 when the two clutches are in neutral.

Fulcrum pivots 13 being anchored to bracket 68 are therefore fixed points. Rockers 16 oscillate about these fixed points and in tilting carry with them the camming rollers 90 on one side of pivot 13 and cylinders 84 and 88 on the other side of pivot 13. Knuckle pin 84, however, has movement independent of rocker frame 66 as this pin 84 turns with links 85 pivoted on fixed spaced fulcrum pins 13. As timing screw 87 is turned the axis of knuckle pin 84 moves from or to the axis of anchor pin 88, pin 84 moving slightly in its bearings in either links 85 or rod 79, or both. With knuckle pin 84 properly adjusted by timing screw 87 and with finger 65 of the uppermost of the three rockers 16 in vertical or midposition, the axis of wrist pin 18 in pressure member 33 (low speed clutch) and fixed fulcrum pivot 13 are in a horizontal plane but the axis of knuckle pin 84 is slightly above while the axes of the camming rollers 90 are below such plane so while rollers 90 may touch the two lugs 92 extending radially beyond the friction faces of the higher speed clutch, its flat driving ring 27 mounted on sleeve 14 is not engaged but the pitman 17 is in tension and pulls the forward or low speed pressure plate to engage the driving ring or disk 25 of the lower speed clutch. With rocker 16 tilted to lower the axis of camming rollers 90 still farther, as in neutral, the clearance between the rollers 90 and the pressure plate 34 of the high speed clutch is increased as the axis of these pressure rollers moves both down and away from pressure plate 34. At the same time the axis of knuckle pin 84 moves upward, forward and nearer to higher speed pressure plate 34 so pitman 17, now in compression, moves lower pressure plate 33 away from clutch driving ring 25, and both clutches are quite free.

Tilting the rockers 16 in a direction opposite to neutral, so the rounded cylinders 63 of the fingers or stems 65 of the rockers are forward lowers the axis of knuckle pin 84, puts the pitman 17 in compression, frees pressure plate 33 to its maximum and brings the axis of pressure rollers 90 above the plane of axes of wrist pin 18 and fulcrum pins 13 thus causing the rollers in overcenter position to exert sufficient pressure on the lugs 92 of higher speed plate 34 to compress springs 44 and engage clutch ring 27 on outer sleeve 14 carrying the higher speed driving pinion 10.

Shims 100 between the bracket 68 and the flat portion 101 of the center clutch plate 35 initially determine the exact positioning of fulcrum pins 13 and therefore the axis of oscillation of the rocker. The thickness of the shims is such that the high speed clutch is engaged when the rocker has tilted either 8° or 12° from neutral, i. e., over center at 10°, assuming a total travel of the rocker at 12°. Rearward travel of higher speed pressure plate 34 is adjusted by turning nut 40.

Timing screw 87, connecting pin 88 anchored in the rocker and knuckle pin 84, the axis of which may move up and down in an arc from main rocker pivots 13, is turned to bring the axis of pin 84 to a position where the pin is at maximum forward travel when the rocker is tilted 4° (again assuming a total travel of 12°). Thus when center screw 80 is adjusted the pitman 17 will pull the lower speed clutch to engagement at 2° and 6°, being over center at 4°. Since the axis of adjustable pin 84 moves rearwardly from the point thus set as the rocker pivots away from low speed position, the lower speed clutch will have ample clearance at zero (neutral) and be quite free when the higher speed clutch is first touched and more so when the latter is in engaged position.

For a radial distance of 1.37" from center of pivot 13 to axis of rollers 90 the distance below horizontal of that axis would be .096" with a total travel of 12°.

The graph of Figure 7 is purely to help in understanding the action. The horizontal lines 103 represent degrees of tilt from neutral position at 0°; the curves 104 and 105 show clearances of the low clutch and the high clutch respectively. The lower speed gear is engaged at 6° and the higher gear at 12°, the total movement. At the top of the figure, representing the neutral position, there is clearance as represented by the horizontal distances from the center line of no clearance. The lower speed clutch line 104 passes over center at 2° and returns at 6° when its gear is engaged. The higher speed clutch line 105 passes over center at 8° and returns at the total movement of 12° when the high gear is engaged. A total travel of from 16° to 20° is preferred depending upon the material used in the rings 25 and 27, i. e., the degree of compressibility of the material used for the driving disks of the two clutches.

As previously stated the gears 10 and 50 which mesh in the preferred form of the driving mechanism may be replaced by slightly smaller gears 10r and 50r as in Figure 8 which do not touch but each engages the idler gear 110 on reverse idler shaft 111 so that gears 10r and 11 will drive the spool 48 on countershaft 49 in opposite directions because of the idler 110, thus giving the ability to shift from reverse to forward by a single movement of the manually controlled clutch shift lever as would be most convenient in shovel loaders, for example.

What I claim is:

1. In combination, a plurality of coaxial shafts, a clutch driving ring on each shaft, an intermediate clutch plate between the two rings, a pressure plate proximate each of the two rings on the side distant from the intermediate clutch plate, a rocker on one side of both clutches, cam means on the side of the rocker nearest the clutches to press the proximate pressure plate into clutching engagement with one of said rings, and means carried by the rocker on the side of its pivot opposite the cam means for pulling the farther pressure plate into clutch engaging position.

2. The combination of claim 1 in which the rocker carried means includes a pin on the rocker positioned a maximum distance from the clutches when the rocker is in midposition, the cam means in such position being out of operative engagement with the proximate pressure plate so that the proximate pressure plate is not in clutch engaging position.

1. In combination, a plurality of coaxial shafts, a clutch faced clutch driving ring on each shaft, an intermediate clutch plate between the two rings, a pressure plate movable to engage the outer face of each of the two rings, a rocker pivoted about an axis to one side of the rings and plates, cam means on the side of the rocker nearest the clutches to press the proximate pressure plate into clutching engagement with one of said rings, and means carried by the rocker on the side of its axis opposite the cam means for pulling the farther pressure plate into clutch engaging position, the rocker carried means including a knuckle pin, links carrying the knuckle pin and movable about the rocker pivot, and a rod having a wrist pin engagement with the farther pressure plate and a pivotal engagement with the knuckle pin.

4. The combination of claim 3 in which the pin is angularly displaced from diametrically opposite the cam means by an amount equal to about half the angular movement of the rocker about its axis.

5. The combination of claim 4 in which the pin is angularly adjustable about the axis of the rocker.

6. A clutch operator for the coaxial pressure plates of a dual clutch comprising a body rockable about an axis at right angles to the axis of the clutches, means to rock the body, cam means at one end of the body to engage the near one of the pressure plates, means resiliently urging said near pressure plate into contact with the cam, and a rigid member connected to the end of the body opposite the cam and to the far one of the pressure plates, said rigid member being roughly parallel to the axis of the dual clutch.

7. A clutch operator for each of two coaxial clutches comprising a body rockable about an axis at right angles to the axis of the clutches, means to rock the body, a camming roller at one end of the body directly engaging one of the clutch plates and a pivot at the opposite end of the body to receive a connector secured to another of the clutch plates.

8. A clutch operator for each of two coaxial clutches comprising a body rockable about an axis at right angles to the axis of the clutches, means to rock the body, camming means at one end of the body to engage one of the clutch plates and a pivot pin at the opposite end of the body to receive a connector secured to another of the clutch plates, said pivot pin being movable with the body and adjustable in an arc about said axis of the body.

9. The operator of claim 8 with an anchor pin rotatable in the body and a screw extending diametrically through the anchor pin and through the pivot pin to alter the distance between the two pins.

10. The operator of claim 9 in which one of the pins carries a pair of links pivoted about the axis of the body.

11. In a tractor of the type including a shaft having affixed thereto a fly-wheel and also a power take-off pinion, and a tractor propelling countershaft: a first sleeve surrounding said fly-wheel shaft, a pinion on said sleeve, a second sleeve surrounding the first sleeve, a pinion on said second sleeve, a pair of gears fast to the counter shaft and meshing with both of the pinions, dual clutch mechanism including a drive disk on each of the two sleeves, and means for selectively connecting either of the two drive disks to rotate with said shaft while said shaft is rotating, whereby to alter the tractor movement without stopping the fly-wheel shaft.

12. In combination, a main shaft, a first sleeve rotatable on said shaft, a second sleeve rotatable on said first sleeve, a central clutch member constrained to rotate with said shaft, an outer clutch pressure plate, an inner clutch pressure plate, a first clutch drive ring on one sleeve, a second clutch drive ring on the other sleeve, means to move either pressure plate at will toward the central clutch member to engage the approximate driving ring, and means for coupling the two sleeves to rotate in the same direction and at different speeds when either of the two clutches is engaged.

13. The combination of claim 12 with resilient means urging one of the two pressure plates away from the proximate drive ring, and a plurality of spaced guide rods fast to the clutch member and slidably mounted in the two pressure plates to cause the two pressure plates and the central clutch member to rotate together.

14. The combination of claim 12 in which the pressure plate moving means includes a cam member directly engaging one pressure plate and an alternate tension and compression rod pivoted to the other pressure plate and rockable about such pivot.

15. The combination of claim 1 in which the pressure plate proximate the cam means has a slot, a hardened steel stop plate adjustable in the slot and having a cylindrical depression receiving the cam means at exactly the midpoint of travel of the rocker.

16. A device for increasing or decreasing the rate of speed of a tractor without stopping the tractor to make the change, comprising a plurality of coaxial shafts, a pinion on one of the shafts, a pinion of different diameter on another of the shafts, a pair of gears revolving together and meshing with the two pinions, whereby when either pinion is driven both shafts are revolved in the same direction, a pair of coaxial clutches on the shafts, and means for selectively engaging either clutch while releasing the other clutch, which means includes a reciprocative member at one end of its travel disengaging both clutches.

17. The combination with a tractor of the type having conventional transmission including a countershaft, of mechanism for increasing or decreasing the speed of the tractor without stopping the tractor to make the change, including a spool gear on the countershaft, a first pinion meshing with one gear of the spool, a second pinion of different diameter meshing with the other gear of the spool, whereby the pinions rotate in the same direction, a drive shaft, a dual clutch having a central member rotatable with the drive shaft, two independently movable pressure plates, and two friction disks, means connecting each disk with one of the pinions for rotation therewith, and sliding means for selectively engaging the pressure plates to drive either pinion in which the sliding means at one end of its travel is in neutral, and in mid position connects the pinion having the larger diameter, and includes a rocker camming one pressure plate and a pitman connecting the rocker to the other pressure plate.

18. A dual clutch assembly including two coaxial sleeves each carrying a drive disk, two outer clamping plates each to engage the proximate disk, a central backing plate unit having a bearing on both of the sleeves, a main shaft coaxial with the sleeves, and means to rotate the backing plate unit on its bearings with the rotation of the main shaft.

19. The assembly of claim 18 with a rocker pivoted on an axis at right angles to the axis of the main shaft, rollers in the rocker engaging one of the clamping plates, a pitman pivoted at one end in the other clamping plate and adjustably pivoted at the other end to an adjustable pin in the rocker.

20. In combination, a dual clutch having two outside pressure plates, an operator comprising a rocker pivoted on an axis at right angles to the axis of the clutch, shiftable means for rocking the rocker, a cylindrical cam roller on the rocker between its pivot and the near pressure plate to engage the latter when the rocker is rocked, an anchoring pin pivoted in the rocker on the side of the rocker pivot opposite the axis of the roller, a pair of links pivoted about the rocker pivot, a knuckle pin oscillatingly mounted in the links, an adjustable length pitman pivoted to the far pressure plate and to the knuckle pin, and an adjusting screw passing thru the two pins for moving the knuckle pin axis above or below a reference plane containing the axis of the pivot for the pitman in the far plate and the rocker pivot.

21. The combination of claim 20 in which the shiftable means includes a rocker stem extending radially from the rocker pivot, the axis of the roller being below the reference plane and the axis of the knuckle pin being above the reference plane when the stem is in mid-position, the axis of the roller is substantially in said plane at one end of the angular travel of the stem and at its lowest point below said plane at the opposite end of angular travel of the stem, at which time the axis of the knuckle pin is farther above the far plate so that both plates are in inoperative or neutral position at this limit of rocking of the rocker, whereby the shiftable means moves the pressure plates from neutral first to one speed and then to the other speed in a single movement in one direction, and in reverse direction from said other speed to said one speed and then to neutral.

22. The combination with a dual clutch including two spaced pressure plates of a rocker movable about a central pivot, an anchoring pin in the rocker, a pair of links movable about the central pivot, a knuckle pin movable in the links with its axis constantly parallel to the central axis, adjustable means for locking the knuckle pin at a chosen distance from the anchoring pin, a roller engaging one of the pressure plates, a pitman pivoted to the other pressure plate and to the knuckle pin.

23. The combination of claim 22 with means for rocking the rocker from a neutral position with both clutches free, successively to mid-position with the knuckle pin at its extreme rearward travel away from the pressure plates and the roller at less than its extreme forward travel, and then to a position with the roller at its extreme forward travel and the knuckle pin short of its extreme rearward travel, whereby the one pressure plate is engaged by the roller with constantly increasing pressure as the rocker is moved from neutral position and the pitman, during such movement, is in tension and then in compression.

References Cited in the file of this patent

UNITED STATES PATENTS

| | | |
|---|---|---|
| 1,353,240 | Ingersoll | Sept. 21, 1920 |
| 1,643,055 | Butell | Sept. 20, 1927 |
| 1,845,332 | Reece | Feb. 16, 1932 |
| 1,975,626 | Tibbetts | Oct. 2, 1934 |
| 2,077,663 | Batten | Apr. 20, 1937 |
| 2,136,049 | Hering | Nov. 8, 1938 |
| 2,168,960 | Morris | Aug. 8, 1939 |
| 2,184,135 | Batten | Dec. 19, 1939 |
| 2,409,515 | Rogers | Oct. 15, 1946 |
| 2,549,896 | Dunham | Apr. 24, 1951 |
| 2,551,939 | Gerst | May 8, 1951 |
| 2,604,197 | Livermore | July 22, 1952 |
| 2,613,778 | Carlson | Oct. 14, 1952 |
| 2,699,689 | Ahlen | Jan. 18, 1955 |